(12) United States Patent
McDonald

(10) Patent No.: US 6,882,443 B1
(45) Date of Patent: *Apr. 19, 2005

(54) PULSE WIDTH POSITION MODULATOR AND CLOCK SKEW SYNCHRONIZER

(75) Inventor: Calvin K. McDonald, Boise, ID (US)

(73) Assignee: Cypress Semiconductor Corp., San Jose, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/001,458

(22) Filed: Nov. 13, 2001

Related U.S. Application Data

(63) Continuation of application No. 09/076,754, filed on May 12, 1998.
(60) Provisional application No. 60/063,827, filed on Oct. 31, 1997.

(51) Int. Cl.[7] .............................. G06F 15/00; B41B 15/00
(52) U.S. Cl. ........................... 358/1.7; 358/1.2; 358/296
(58) Field of Search ........................... 358/1.2, 1.7, 296, 358/433, 447, 448, 298; 382/724; 347/247, 249, 250, 252

(56) References Cited

U.S. PATENT DOCUMENTS

| 5,109,283 | A |   | 4/1992 | Carley ......................... 358/398 |
|---|---|---|---|---|
| 5,122,883 | A |   | 6/1992 | Carley ......................... 358/296 |
| 5,379,126 | A | * | 1/1995 | Seto et al. .................. 358/298 |
| 5,488,487 | A | * | 1/1996 | Ojima et al. ................ 358/456 |
| 5,754,303 | A | * | 5/1998 | Ito et al. ..................... 358/298 |
| 5,990,923 | A | * | 11/1999 | Morrison .................... 347/252 |
| 6,362,898 | B1 | * | 3/2002 | McDonald ................. 358/1.7 |

* cited by examiner

*Primary Examiner*—Twyler M. Lamb
(74) *Attorney, Agent, or Firm*—Marger Johnson & McCollom, PC

(57) ABSTRACT

A pulse width position modulator (PWPM) includes a digital delay circuit that outputs multiple subclocks according to a native pixel clock. The multiple subclocks are each skewed within different time periods of the native pixel clock period. A skew pulse generator receives the multiple subclocks from the digital delay circuit and outputs multiple subpixels according to different logical combinations of the multiple subclocks thereby providing increased subpixel output resolution using the native pixel clock. A clock skew synchronizer aligns the subpixels with a line synchronization signal. The clock skew synchronizer allows lines in a printed image to be aligned with the line synchronization signal within subpixel resolution without using high frequency sampling circuity.

24 Claims, 8 Drawing Sheets

PULSE WIDTH POSITION MODULATOR AND CLOCK SKEW SYNCHRONIZER

BACKGROUND OF THE INVENTION

This application is a continuation of prior application Ser. No. 09/076,754, filed May 12, 1998, which claims benefit of Provisional Appl. No. 60/063,827, filed Oct. 31, 1997.

This invention relates to print engines and more specifically to a pulse width position modulation circuit and clock skew synchronizer circuit that generates and synchronizes subpixels without requiring high clock frequencies.

A marking engine is an electromechanical device that takes digital video data and marks a paper media with the image represented by the video data. A native pixel is the inherent single pixel size of the marking engine in a scan direction of, for example, 600 dots per square inch (dpi). A subpixel is a portion (usually 1/N where $N=2^M$) of a native pixel. Gray-scale is a scale of gray tones graduating from black to white. A gray-scale also denotes tone scales in color.

Marking engines, color or black & white, commonly have little ability to mark paper with gray-scale images. This presents little or no problem when printing black or solid color text and line-art. For images, the story is different. To mark graphic images, the ability to print gray-scales, or something that is perceived by the human eye to be gray-scale, is crucial. This is accomplished by controlling the placement, size and pattern of pixels and letting the human eye integrate the pattern to a perceived shade. Control is needed for manipulation of subpixels at a finer resolution than provided for in marking engines' native pixels.

A native pixel of a particular marking engine may be generated, for example, every 64 nano seconds (ns). A very accurate system is needed to apply video data to the print output logic every 64 ns. A typical digital circuit oscillator or crystal derived clock would need to operate at a frequency of 15.625 MHz. To produce subpixels for the system at 4 subpixels/native pixel, a subpixel period of 16 ns or 62.5 MHz is needed. If the desired subpixel frequency is higher than the clock frequency in which the printing device technology can support, the subpixels are very difficult to generate. For example, outputting 16 subpixels in a standard 20–100 ns pixel time period, requires a clock rate two-four times faster than a typical 0.35 $\mu$m CMOS integrated circuit fabrication process will support. Thus making it difficult to generate subpixels at many desired subpixel frequencies.

In many bit-serial laser printer interfaces, a Line Sync (LS) signal is used to mark the beginning of each pixel-wide imaging row. The LS signal is alternatively referred to as a horizontal sync or beam detect signal and allows the marking engine to synchronize video generation logic with the marking mechanism. The video data must be synchronized to the LS signal in order to get horizontal alignment of data placement on the page. The video generation logic is typically a clocked digital system and the LS signal is typically generated asynchronously with the digital system.

A common method of synchronizing circuitry with the LS signal uses a sampling circuit that runs on a faster clock. The sampling circuit samples the phase relationship of the LS signal with the native pixel clock and then makes a one-time phase shift of the native pixel clock to phase align it to the arriving LS signal. Other synchronizing circuits generate an array of phase shifted native pixel clocks (typically taps off a series of delay elements) and then uses a LS signal phase detector that picks which phase-shifted version to use.

Accurate synchronization between the native pixel clock and the LS signal is often not possible using the systems described above because of the high sampling rate required to accurately detect the LS signal.

U.S. Pat. No. 5,109,283 entitled: Raster Scanning Engine Driver Which Independently Locates Engine Drive Signal Transistors Within Each Cell Area and U.S. Pat. No. 5,122,883 entitled: Raster Scanning Engine Driver Which Independently Locates Engine Drive Signal Transitions Within Each Pixel, each to Carley, discuss a raster print engine driver that generates modulated drive signals from incoming image data. Drive signal transitions cause a print engine to reproduce the image data as a series of modulated print lines.

The system in Carley uses an analog ramp generator to control the position and width of the digital video signal that controls printing of line segments on a printing medium. Only one line segment is generated during each cell clock period. Because Carley cannot increase subpixel resolution without increasing the frequency cell clock, high resolution subpixel output is not possible. Further, the analog ramp generators in Carley are expensive and less consistent in different operating conditions and between different print engines.

Accordingly, a need remains for printing video image data at high subpixel frequencies without increasing the native clock frequency and more accurately synchronizing printer circuitry with asynchronous line synchronization signals.

SUMMARY OF THE INVENTION

A pulse width position modulator (PWPM) includes a digital delay circuit that outputs multiple subclocks according to a native pixel clock. The multiple subclocks are each skewed to different phases of the native clock. A skew pulse generator receives the multiple subclocks from the digital delay circuit and outputs multiple subpixels according to different logical combinations of the multiple subclocks thereby providing increased subpixel output resolution using the native pixel clock frequency.

The skew pulse generator includes a pulse generator for generating different skewed clock pulses from the subclocks. The different clock pulses are each used to control the output for one of the subpixels. In one embodiment, the pulse generator comprises multiple AND gates that logically combine two different subclocks together to form one of the clock pulses. The skew pulse generator also includes output buffers that each receive an associated one of the subpixels and are output enabled by an associated one of the clock pulses.

Registers clock the subpixels input to the skew pulse generator. A first set of registers supply a first half of the subpixels to the skew pulse generator after a falling edge of the native pixel clock and a second set of registers supply a second half of the subpixels to the skew pulse generator after a rising edge of the native pixel clock. The registers eliminate race conditions between the native pixel clock and the subpixels.

The PWPM can operate in an associative mode, where an associative shift register generates' addresses associated with different pixel values. A lookup table is coupled between the associative shift register and the skew pulse generator. The lookup table generates subpixel patterns for the native pixel according to the address generated by the associative shift register. The associative shift register is programmable to generate addresses according to a selectable number of bits per pixel. The associative shift register also varies the number of native pixels combined to generate the subpixel address according to the number of bits per native pixel. The PWPM also operates in a literal mode where the associative shift register outputs a group of bits representing one native pixel value. A bit expander expands each bit in the group into one or more subpixels. The shift register and the bit expander are programmable to operate in different bit per pixel modes.

A clock skew synchronizer aligns the subpixels with a line synchronization signal. The clock skew synchronizer uses the digital delay circuit skewed subclock output. Multiple registers each have a data input coupled to one of the subclocks and a clock input coupled to the line synchronization signal. An edge detector is coupled to data outputs of the multiple registers. The edge detector generates a shift value according to which of the registers first detect actuation of the line synchronization signal. A shift register then uses the shift value to shift the subpixels into alignment with the line synchronization signal. The clock skew synchronizer aligns subpixels in a printed image with the line synchronization signal at high subpixel resolution without using high frequency sampling circuity.

The foregoing and other objects, features and advantages of the invention will become more readily apparent from the following detailed description of a preferred embodiment of the invention which proceeds with reference to the accompanying drawings.

DETAILED DESCRIPTION
Pulse Width Position Modulator

Figure 1:
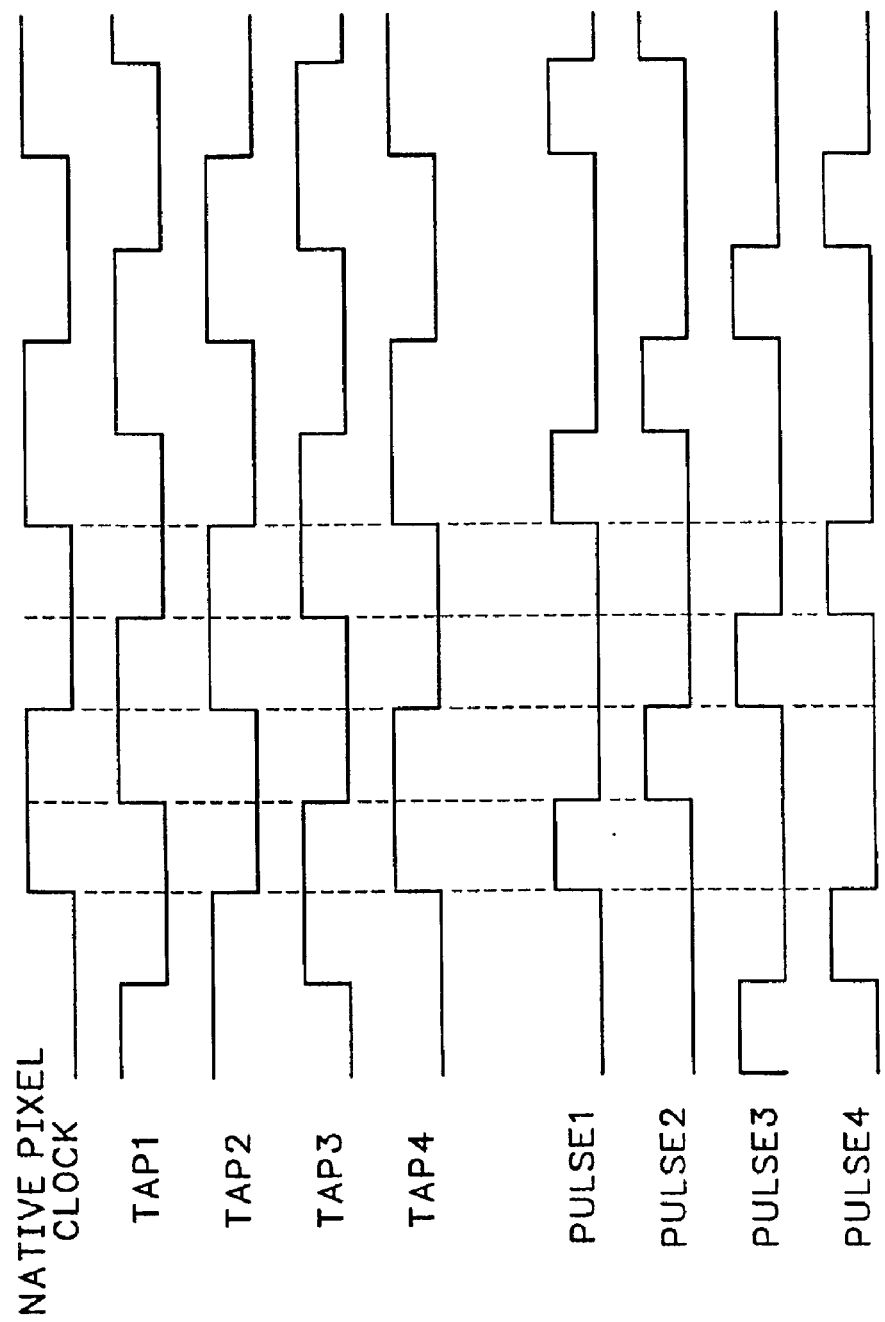
FIG. 1 is timing diagram of skewed clock pulses used for controlling subpixels in a print engine according to the invention.

FIG. 1 shows a native pixel clock signal CLKIN used to generate multiple output subclock waveforms TAP1-TAPN, where for illustrative purposes, N=4. Each subclock is skewed by a different percentage of the CLKIN clock period. The skewed waveforms are used to generate multiple clock pulse trains that control the output of subpixels at resolutions higher than the clock signal. The example shown in FIG. 1 is for a N=4 digital delay line (DDL) circuit that generates four pulse trains PULSE1–PULSE4. The pulse trains PULSE1–PULSE4 control a video data output stream of subpixels for a ¼ subpixel resolution. The system is adaptable to provide any 1/N subpixel resolution without requiring a higher clock frequency.

Figure 2:
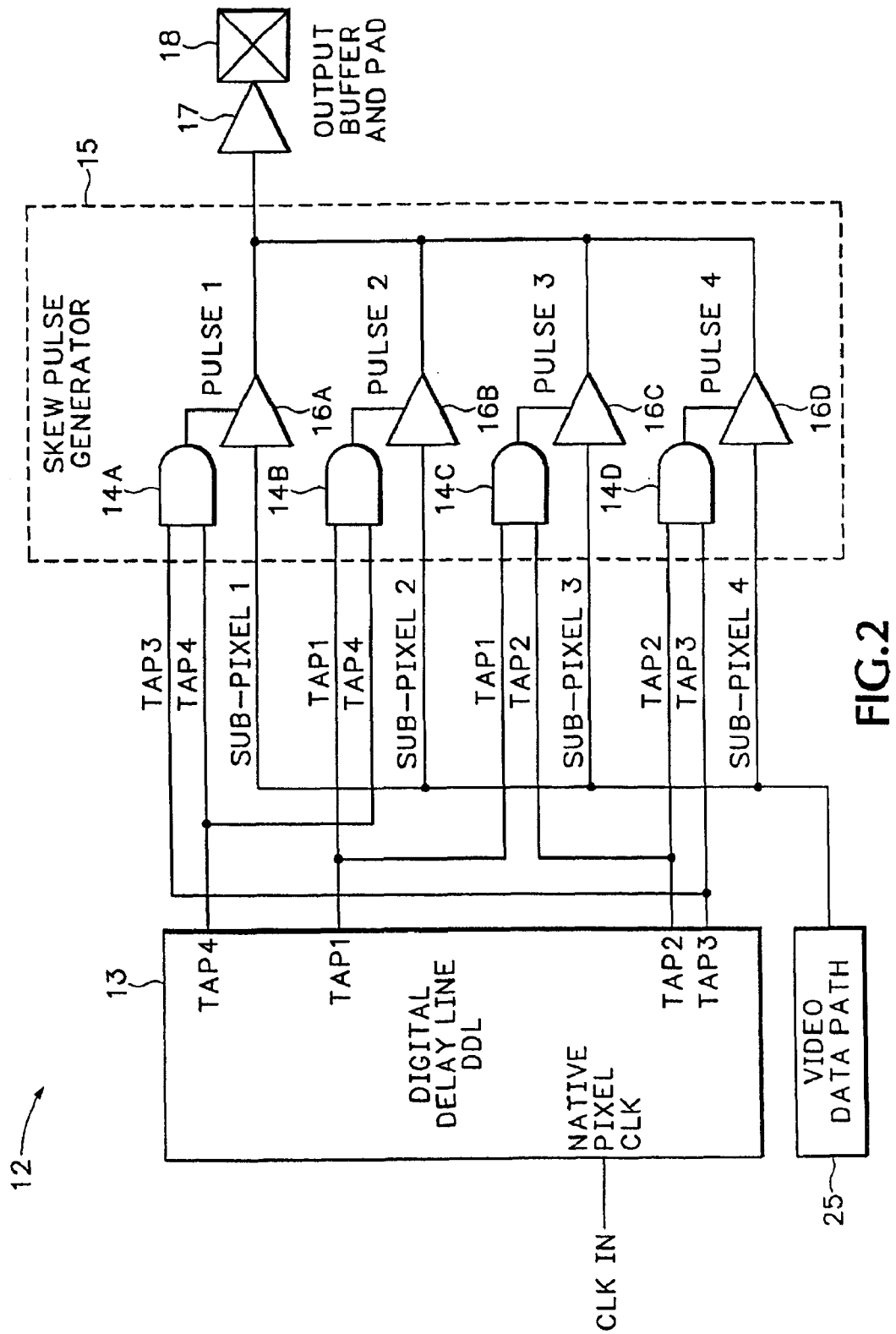
FIG. 2 is a circuit diagram of a virtual clock multiplier.

FIG. 2 shows a Virtual Clock Multiplier (VCM) circuit 12 that produces the four pulse trains shown in FIG. 1. The VCM 12 includes a DDL 13 and a Skew Pulse Generator (SPG) 15. The DDL 13 is an analog device that receives the native pixel clock CLKIN and outputs N subclocks TAP1-TAPN, each skewed by P/N ns from each other where P is the period of the native pixel clock CLKIN. The DDL 13 is a commercially available macrocell component made by Lucent Technologies.

The SPG 15 includes AND gates 14A–14D and tri-state buffers 16A–16D. The subclock TAPs 3&4, 1&4, 1&2 and 2&3 from the DDL 13 are logically ANDed together by the AND gates 14A–14D, generating the 4 clock pulse trains PULSE1–PULSE4, respectively. The clock pulse signals PULSE1–PULSE4 are used as output enables for tri-state buffers 16A–16D, respectively. Subpixel image data subpixel 1–subpixel 4 are fed from a video data path 25 into the tri-state buffers 16A–16D. The subpixel image data is output from the tri-state buffers 16A–16D through an output buffer 17 forming video signal VOUT at an output pad 18.

Actual implementation of the AND gates 14A–14D and the tri-state drives 16A–16D can vary according to how the SPG 15 is implemented on the integrated circuit. For example, the SPG 15 may be incorporated into the same integrated circuit with the DDL 13. Depending on layout considerations, such as propagation delays, different gate or transistor arrangements may be required to implement the logic shown in FIG. 2.

Video data (subpixel 1–subpixel 4) must be previously setup at the inputs of the tri-state buffers 16A–16D when the buffers are turned on by PULSE1–PULSE4. The buffers 16A–16D each take turns turning on during each native pixel clock period (P) of the native pixel clock. If new subpixel image data is supplied on the rising edge of the native pixel clock CLKIN, a data race condition occurs in the first tri-state buffer 16A. The race condition becomes more severe as the native pixel clock rate and N increase.

Figure 3:
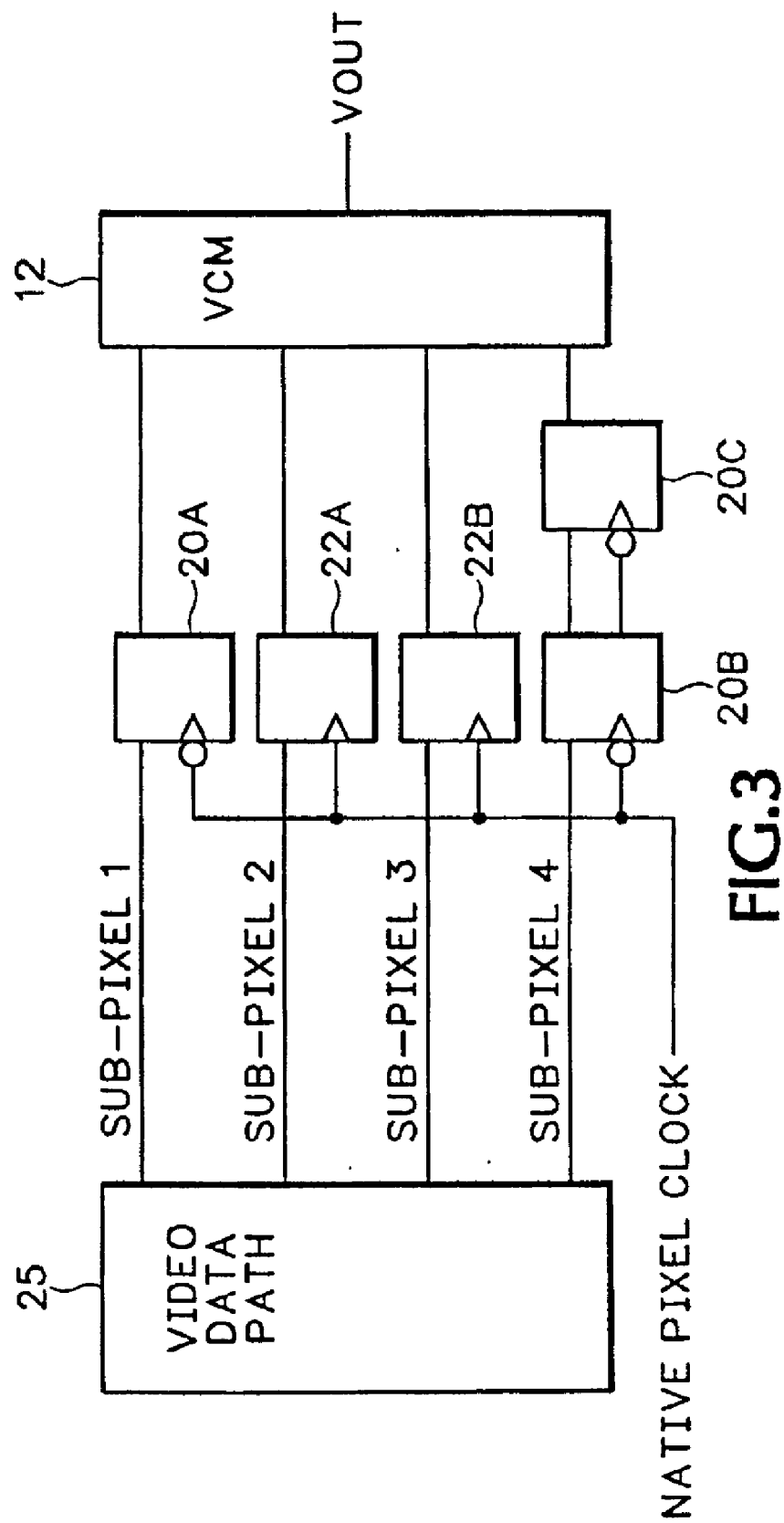
FIG. 3 is a block diagram of a circuit that prevents race conditions in the virtual clock multiplier, shown in FIG. 2.

A circuit that solves the data setup problem is shown in FIG. 3. A first set of registers 20A, 20B and 20C are coupled between the subpixel 1 and subpixel 4 signals and VCM 12. A second set of registers 22A and 22B are coupled between the subpixel 2 and subpixel 3 signals and VCM 12. Registers 20A, 20B and 20C are clocked on the falling edge of native pixel clock CLKIN and registers 22A and 22B is clocked on the rising edge of CLKIN. Thus, the registers 20A–C and 22A–B feed the image data (subpixel 1–4) into the VCM 12 one half at a time.

The subpixels 1 and 4 are latched on the falling edge of the native pixel clock and the subpixels 2 and 3 are latched on the rising edge occurring on the next native pixel clock cycle. Subpixels 1 and 4 latched on the previous falling edge of CLKIN are then output from registers 20A–20C to the VCM 12 before the first half of the next CLKIN clock cycle. Since subpixels, 2 and 3 are latched on the rising edge of CLKIN, registers 22A and 221 output the subpixels to the VCM 12 before the second half of the CLKIN clock cycle. Thus, registers 20A–C and 22A and B prevent race conditions in the VCM 12.

Figure 4:
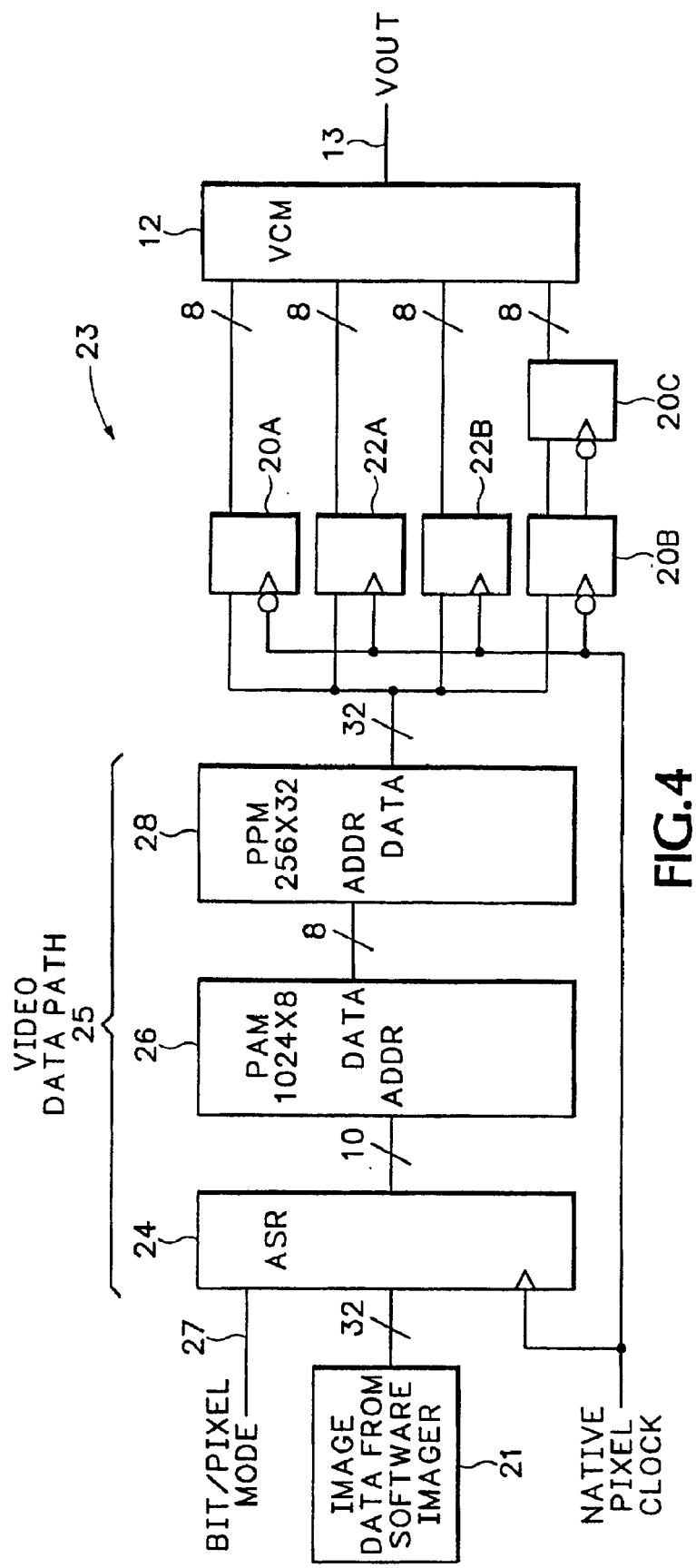
FIG. 4 is a block diagram of a pulse width position modulation circuit operating in an associative mode according to another embodiment of the invention.

FIG. 4 shows a Pulse Width Position Modulator (PWPM) circuit 23 that includes a video data path 25 and the VCM 12. The PWPM 23 shown in FIG. 4 operates in an associative mode. The associative mode uses lookup tables 26 and 28 to produce N subpixels that are then fed to the VCM 12. The example shown in FIG. 4 produces N=32 subpixels. The incoming video data from a software imager 21 is treated as an address to the tables. Multi-bit/pixel data (e.g, contone) of pulse width and position modulated bit patterns are looked-up in the tables 26 and 28. Depending on the size of the tables, several input multi-bit pixels can be examined together to pick a PWPM pattern for the input pixels based on the adjacent pixels.

An Association Shift Register (ASR) 24 receives data from the software imager 21 and, depending on the bitsper-pixel mode, generates an address that is fed into a Pixel Association Memory (PAM) 26. The PAM 26 lookup result becomes the address to a Pixel Pattern Memory (PPM) 28. The PPM 28 is a storage table of 32-bit subpixel patterns that are serialized by the VCM 12. The two lookup tables 26 and 28 perform a double indirect lookup for each input pixel element provided by the software imager 21. The lookup tables 26 and 28 are fully programmable by software providing full flexibility on the lookup results.

The pixels output from the software imager 21 may be represented by a single bit or multiple bits such a 2 bits/pixel, 4 bits/pixel, 8 bits/pixel, etc. The ASR 24 receives a BIT/PIXEL mode signal 23 from printer control circuitry (not shown) that identifies the number of bits per pixel output by the software imager. The ASR 24 then generates an address to PAM 26 depending on the bits/pixel output from the software imager 21.

The width of the address bus to the PAM 26 depends on the lookup table size, number of native pixel element "viewed" at a time and the size of the native pixel elements. For example, if the native pixel element size is 4-bits and 3 native pixel elements are viewed at a time, the bus width will be 12. The memory table size will then be $2^K \times N$ bits or 128 thousand bits for a bus width of K=12 and a number of subpixels N=32. For the 1, 2 and 4 bits/pixel cases, the multiple pixel element inclusion in the PAM 26 lookup address generates a final modulation pattern from the VCM 12 for a particular pixel element that is a function of neighboring pixels.

The values addressed in the PAM 26 and PPM 28 determine the subpixel patterns output from PPM 28. The subpixel patterns stored in PAM 26 and PPM 28 are used for halftoning, edge smoothing, etc. The two lookup tables 26 and 28 can be incorporated into a single Random Access Memory (RAM) or Read Only Memory (ROM) or can utilize the dual-table approach shown in FIG. 4. The multi-table approach takes advantage of redundancy in the output patterns at the input of the VCM 12 to reduce the size of each table.

Figure 5:
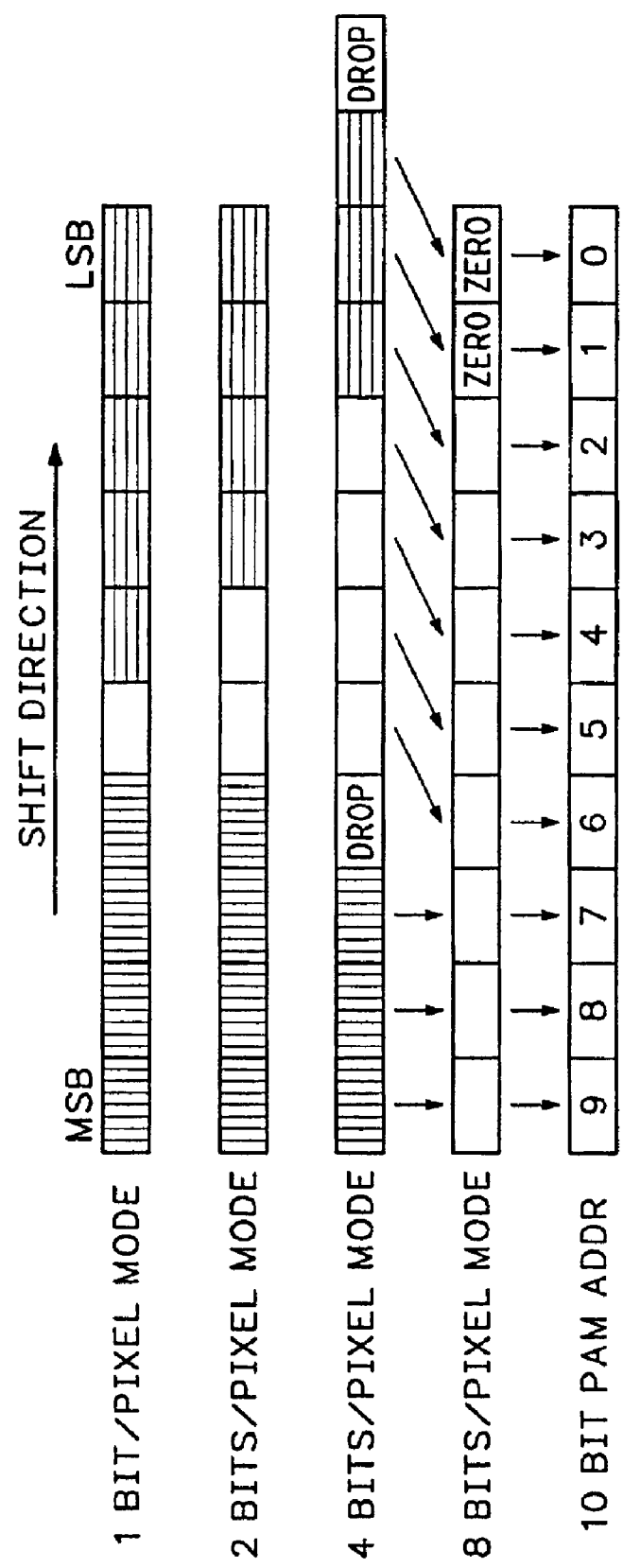
FIG. 5 is a diagram of an associative shift register shown in FIG. 4.

Referring to FIG. 5, a register in ASR 24 shows the bit order and position of the pixel elements used to generate the address for PALM 26 and the bit definitions during boundary conditions. FIG. 5 is an example of a PAM size of 10 address lines. The 10 bit address lines are used for different bit/pixel modes. The non-shaded boxes in FIG. 5 represent the "center" pixel element, or the pixel for which the current native pixel clock period is looking up a subpixel pattern. The column arrows show which bits are used in the generation of the PAM 26 address and in what bit order. The shaded boxes show the starting and ending position of the first and last pixel element of each fast-scan dot row. At the beginning of each fast-scan dot row the first pixel element is loaded into the non-shaded box(es). The horizontal-lined boxes are preceding pixel elements to the center pixel element and are initialized with "0". The vertical-lined boxes are filled with subsequent pixel element(s) to the center pixel element. At the end of each fast-scan dot row the horizontal-lined boxes hold the previous pixel element(s) and the vertical-lined boxes are filled with '0'.

With each native pixel clock, the ASR 24 shifts by the pixel element size, dropping the oldest pixel element in the internal shift register and adding a new pixel element. There are 10 pixel elements represented in the 1 bit/pixel mode, five in the 2 bits/pixel mode, and three in the 4 bits/pixel mode. For the 1, 2 and 4 bits/pixel cases, the 10 bit address represents more than one pixel element. In the 8 bits/pixel mode, a 10 bit address generated by the ASR 24 represents one pixel element with the two low order address bits of the 10 bit address forced to "0".

The 4 bits/pixel case does not replicate evenly into the 10 bit address. In this mode the 10 bit address is generated by dropping the least significant bit of the outside two nibble-sized pixels immediately preceding and following the center pixel (non-shaded). In the 2 bit/pixel mode, the address is generated for the non-shaded two bit pixel by including the two pixels immediately preceding the center pixel and the two pixels immediately following the center pixel. In the 1 bit/pixel mode, the address associated with the center non-shaded pixel is generated by including the first 5 pixels immediately preceding the center pixel and the 4 pixels following the center pixel.

The PAM 26 uses the values in the ASR 24 to address a lookup table associated with the present bit/pixel mode. The lookup table represents a predetermined subpixel pattern that is then output to registers 20 and 22. Different numbers or combinations of address lines and address modes can be used in a similar manner according to design requirements.

Figure 6:
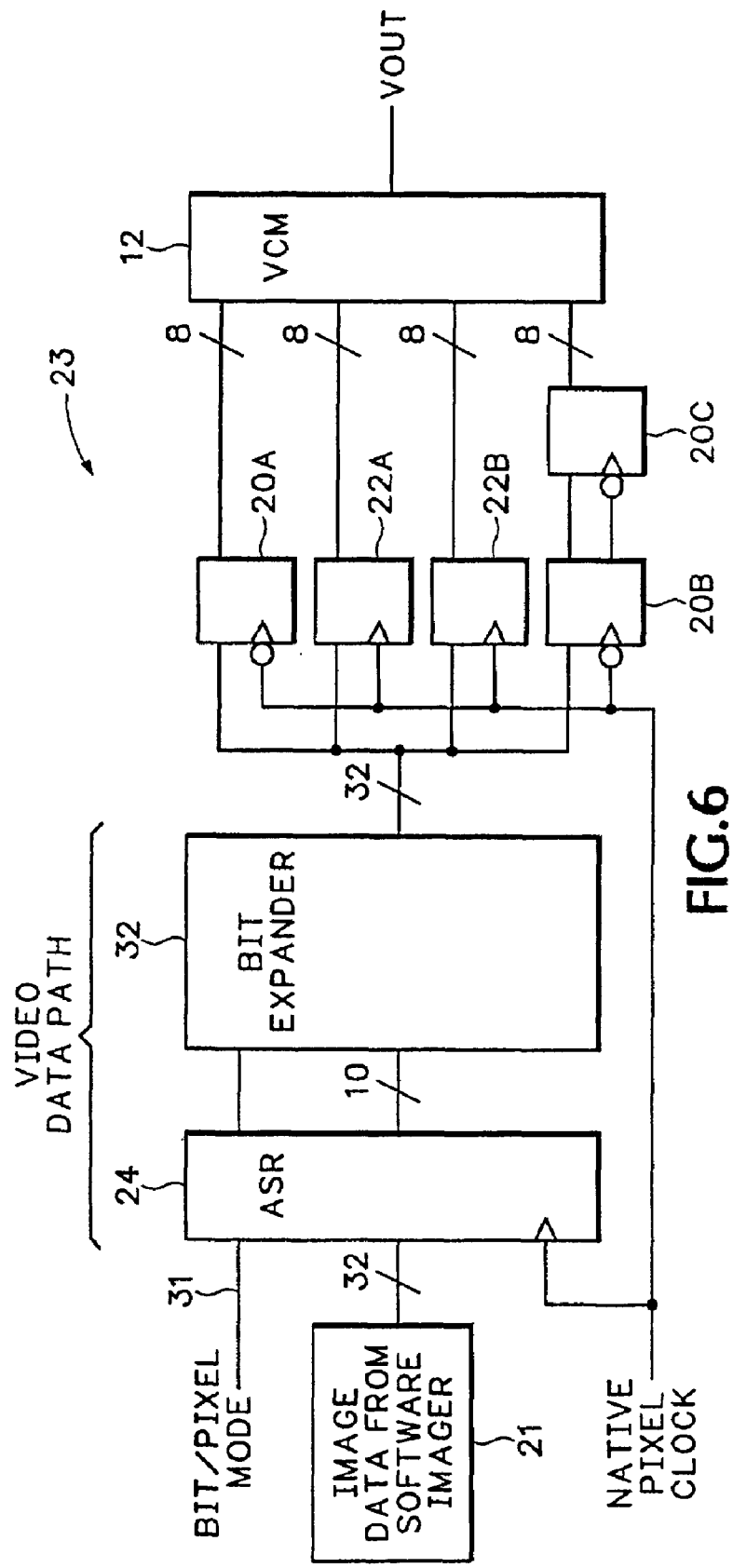
FIG. 6 is a block diagram of a pulse width position modulation circuit operating in a literal mode according to another embodiment of the invention.

FIG. 6 shows the PWPM 23 operating in a literal mode where pixel data from the software imager 21 is always single bit/pixel. The example in FIG. 6 shows a N=32 bit PWPM 23. The PAM 24 and PPM 26 lookup tables in FIG. 4 are replaced in the video data path 25 by a bit expander 32. A software programmable bits/pixel mode control line 31 controls how many pixels are printed for one native pixel time period. The ASR 24 determines whether it is in either 1, 2, 4, 8, etc. bit/pixel mode and then shifts the corresponding number of bits to the bit expander 32.

In the 1 bit/pixel mode, the entire video output logic shown in FIG. 6 reduces to the base case of printing straight 600 DPI. In the 1 bit/pixel mode, the bit expander 32 takes 1 bit from the ASR 24 on each native pixel clock period and bit expands the 1 bit to 32 subpixels. For example, when the pixel bit is a logic 1, the bit expander 32 expands the single pixel bit to 32 logic 1 bits. Thus, all 32 subpixels will be logic 1 values.

In the 2 bits/pixel mode, 1200 DPI is generated by the ASR 24 by taking two bits from the software imager 21 for each native pixel clock period. If the first bit associated with a first pixel is a logic 0, the 0 is expanded to 16 zeros by the bit expander 32 and fed into the VCM 12 as the upper 16 subpixels. If the second bit associated with a second pixel is a logic 1, the 1 is expanded into 16 logic 1's by the bit expander 32 and fed into the VCM 12 as the lower 16 subpixels. Programming 4 bits/pixel gives 2400 DPI and programming 8 bits/pixel gives 4800 DPI etc. In 8 bits/pixel mode, the bit expander 32 takes 8 pixels from the ASR 24 on each native pixel period and bit expands the bit associated with each one of the 8 pixels into 4 subpixel bits. The output of the VCM 12 then provides 4800 DPI resolution.

Clock Skew Synchronizer

Marking engines use a fast-scan laser sweep timing signal called a Line Sync (LS) that is also referred to as a beam detect or horizontal sync signal. The LS signal is used to time the start of video data to the marking engine on each fast scan sweep. Synchronizing the video output stream with the LS signal is critical for aligning horizontal positioning from scan line to scan line down a page. Because the LS signal is typically asynchronous to the native pixel clock, it is often not possible to perfectly synchronize the video data to LS. Closeness of synchronization is often measured in a $\frac{1}{2}^{th}$ percentage, for example, $\frac{1}{8}^{th}$ of a native pixel. This means that the image data will start exactly at the same horizontal position on the paper $+-\frac{1}{16}^{th}$ of a native pixel. There is little benefit in generating $\frac{1}{32}$ subpixel resolution if, from scan row to scan row, position relationship is not controlled down the page.

Figure 7:
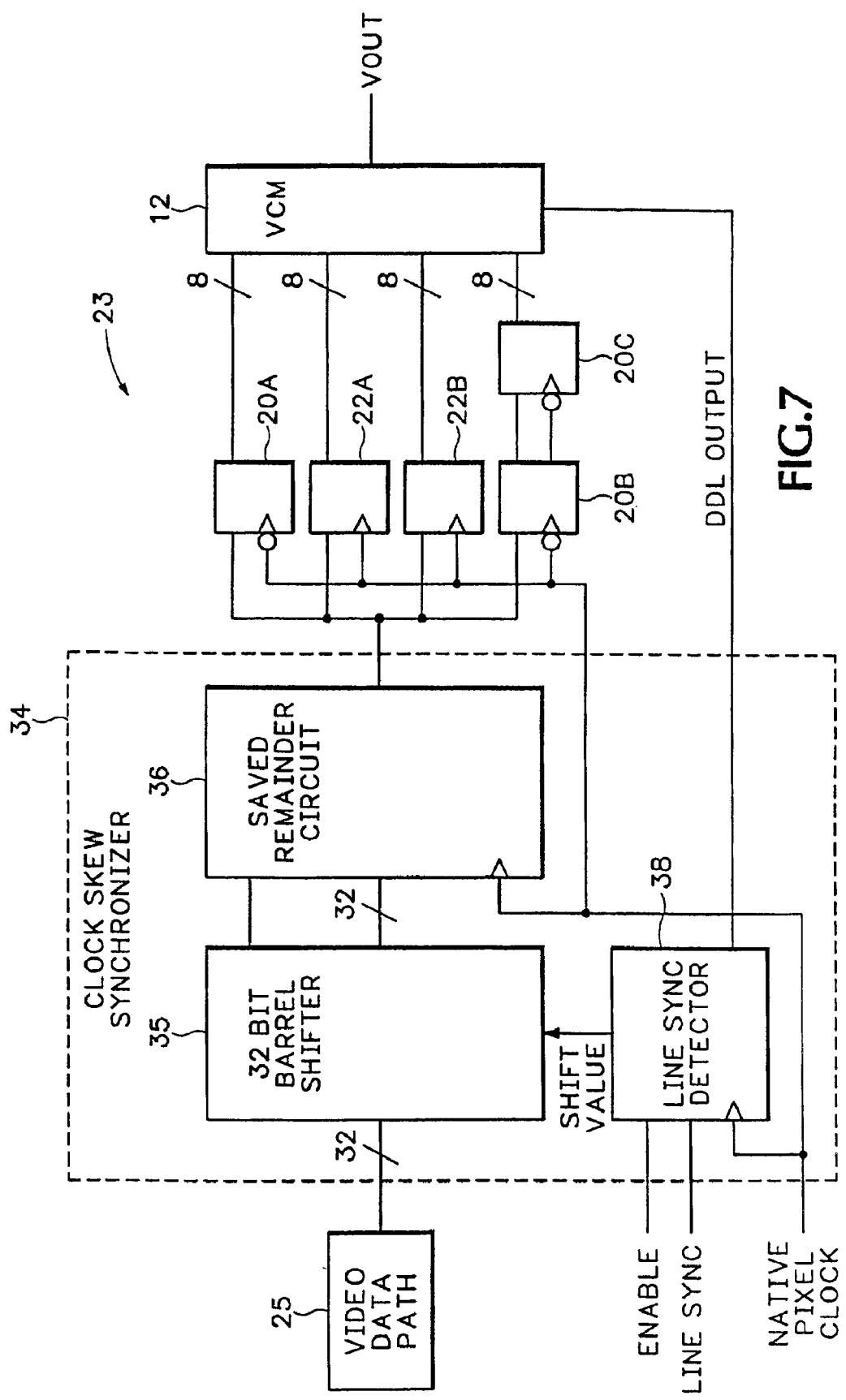
FIG. 7 is a block diagram of a clock skew synchronizer according to another embodiment of the invention.
Figure 8:
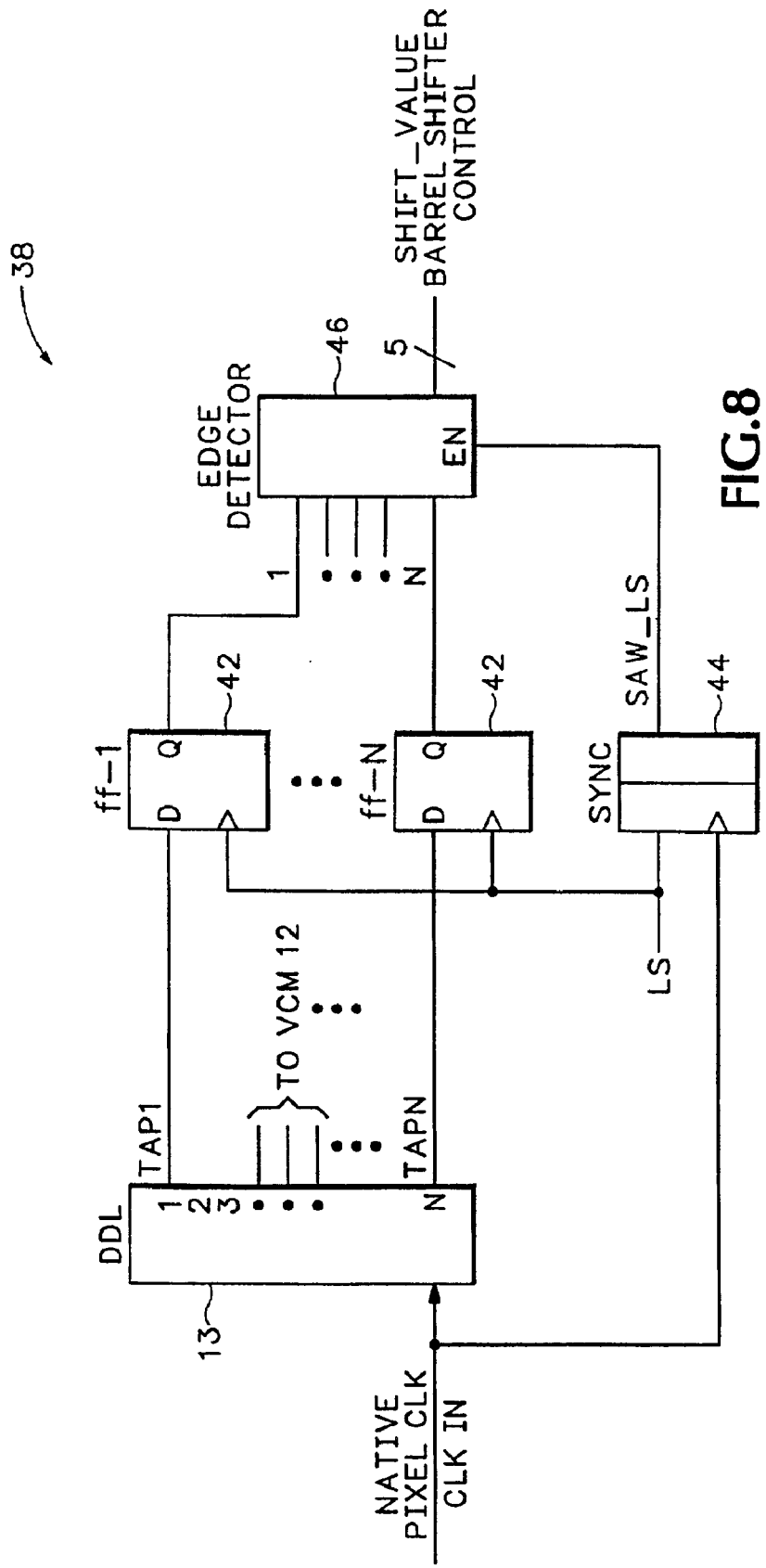
FIG. 8 is a detailed diagram of a line sync detector used in the clock skew synchronizer shown in FIG. 7.

Referring to FIGS. 7 and 8, a Clock Skew Synchronizer (CSS) 34 synchronizes the video data stream from the video data path 25 with the LS signal. Fine subpixel control of the video data is provided by the associative and literal modes of the PWPM circuits 23 shown in FIGS. 4 and 6. Rather than using a high frequency clock to sample the LS signal, the CSS 34 aligns the video data from video data path 25 with the LS signal. The CSS 34 synchronizes the video data to the LS signal with an accuracy of 1/N of a native pixel. This It translates to $\frac{1}{19200}^{th}$ of an inch for a 600 DPI marking engine, and N=32.

The CSS 34 is inserted between the data path 25 and the VCM 12 of the PWPM 23. The CSS 34 includes an N bit barrel shifter 35 and a saved remainder register 36 that align the outgoing subpixel data with the LS signal. A line sync detector 38 receives an ENABLE, CLKIN and LS from the marking engine and control circuitry (not show). The line sync detector 38 generates a SHIFT_VALUE signal that tells the barrel shifter 35 how many subpixels to shift into the VCM 12.

Referring specifically to FIG. 8, the line sync detector 38 uses the Digital Delay Line (DDL) 13 previously shown in VCM 12 (FIG. 2). Each of the subclock taps of the DDL 13 feed a data input terminals for a different flip-flop 42. Each flip-flop 42 has a clock input coupled to the LS signal and a Q output terminal coupled to an edge detector circuit 46. A synchronizer 44 is clocked by the CLKIN signal, receives the LS signal as a data input and outputs a SAW_LS signal that is used to latch the edge detector 46 and hold its value for the remainder of the scan line. The sync circuit 44 also must verify and track which native clock period LS arrived in. SHIFT_VALUE tracks where in the period LS happened and SAW_LS tracks which period.

The LS signal clocks the subclock TAPS 1–N into the N flip-flops 42 creating a picture of where the rising edge of the LS signal occurred relative to the subclock TAPS. When the LS signal is asserted, the synchronizer 44 generates the SAW_LS signal that latches the edge detector output 46. The edge detector 46 determines which Nth time slice of the period the rising edge of the LS signal arrived in and then sends a shift value to the barrel shifter 35. The barrel shifter 35 shifts the subpixel data by the associated number of subpixel periods. Thus, the barrel shifter 35 shifts the video data to an accuracy of P/N ns, or 1/Nth of a native pixel.

The DDL 13 generates a series of 32 equally spaced subclocks. The output of flip-flops 42 generate the values "000 . . . 00 . . . 0". For N=32 there will be 16 0's and 16 1's. The edge detector circuit 46 determines that assertion of the LS signal was first detected by the fourth flip-flop. This indicates the arrival time of the LS signal at ($\frac{4}{32}$)×P ns after the beginning of the native pixel clock period P where N=32. The SHIFT_VALUE signal 4 is sent to the barrel shifter 35. The barrel shifter 35 then shifts out 28 subpixels to the VCM 12. The last 4 subpixels are saved in the saved remainder circuit 36 for outputting as the first 4 subpixels in the next native pixel clock cycle along with the next 28 subpixels of the next native pixel. Thus, the subpixels are skewed in time relative to each other to within $\frac{1}{32}$nd of a native clock period.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A modulator, comprising:
    a delay circuit receiving a native pixel clock and outputting multiple subclocks at multiple different positions within the same native pixel clock period; and
    a skew pulse generator outputting multiple subpixels during each native pixel clock period according to the multiple output subclocks.

2. A modulator according to claim 1 wherein the delay circuit outputs N subclocks for each clock period of the native pixel clock, where N is an integer.

3. A modulator according to claim 1 wherein the skew pulse generator includes a pulse generator for generating multiple differently skewed clock pulses from the subclocks within each native pixel clock period, the different clock pulses each controlling the output for an associated one of the subpixels.

4. A modulator according to claim 3 wherein the pulse generator comprises multiple AND gates that logically combine different subclock combinations together to form one of the clock pulses.

5. A modulator according to claim 3 wherein the skew pulse generator includes output buffers each receiving an associated one of the subpixels and output enabled by an associated one of the clock pulses.

6. A modulator according to claim 5 wherein the buffers comprise tri-state buffers.

7. A modulator according to claim 1 including a first set of registers supplying a first half of the subpixels to the skew pulse generator after a falling edge of the native pixel clock signal and a second set of registers supplying a second half of the subpixels to the skew pulse generator after a rising edge of the native pixel clock signal.

8. A modulator according to claim 1 including:
    an associative shift register generating addresses associated with pixel values; and
    a look-up table coupled between the associative shift register and the skew pulse generator, the look-up table generating subpixels for the pixel values according to the associated address.

9. A modulator according to claim 8 wherein the associative shift register is programmable to generate the addresses according to a selectable number of bits associated with each pixel value.

10. A modulator according to claim 9 wherein the associative shift register varies a number of pixel values combined to generate the addresses according to the number of bits associated with each pixel value.

11. A modulator according to claim 1 including:
    a literal mode shift register outputting a number of bits each representing a pixel value of an image to be printed which in tun becomes a subpixel relative to the native clock period; and
    a bit expander expanding each one of the bits output from the shift register into a group of subpixels relative to the native clock period.

12. A modulator according to claim 11 wherein the literal mode shift register and the bit expander are programmable to generate a selectable number of subpixels for each pixel value thereby varying dot per inch pixel resolution.

13. A modulator according to claim 1 including a clock skew synchronizer coupled to the skew pulse generator for aligning the subpixels with a line synchronization signal.

14. A modulator according to claim 13 wherein the clock skew synchronizer includes the following:
    multiple registers having date inputs coupled to the different subclocks output from the digital delay circuit, clock inputs coupled to the line synchronization signal and data outputs, an edge detector coupled to the data outputs of the multiple registers, the edge detector generating a shift value according to which of the subclocks is first clocked into the multiple registers by the line synchronization signal; and a shift register shifting the subpixels into the skew pulse generator according to the shift value.

15. A method for aligning subpixels with a line synchronization signal comprising:

generating multiple subclocks at different percentages of a native pixel clock period;

identifying a first one of the subclocks active when the line synchronization signal is initially asserted;

generating a shift value according to the identified one of the subclocks; and shifting the subpixels according to the shift value.

16. A method according to claim 15 including shifting out the subpixels according to the shift value during the native clock period and outputting any remaining subpixels during a next clock period of the native pixel clock.

17. A method according to claim 15 including:

generating the multiple subclocks at multiple different positions within the native pixel clock period;

generating different clock pulses by combining different combinations of the subclocks together, and generating multiple subpixels within the native pixel clock period by generating the subpixels according to the multiple clock pulses.

18. A method for generating subpixels in a print engine, comprising:

generating multiple subclocks each skewed to multiple different positions within the native pixel clock period;

generating different clock pulses for each native pixel clock period by combining different combinations of the subclocks together, and generating multiple subpixels within the native pixel clock period by generating the subpixels according to the multiple clock pulses.

19. A method according to claim 18 including:

generating address values according to a selectable bit per pixel mode that varies a number of bits associated with a center native pixel and varies a number of native pixels preceding and following the center native pixel; and outputting subpixels associated with the center native pixel according to the address values.

20. A method according to claim 19 including:

receiving bits each associated with one of the native pixels;

outputting the bits in selectable sized groups for each native pixel clock period; and expanding each bit in the group into one or more subpixels, the number of subpixels expanded from each bit varying according to the number of bits in the group.

21. A method according to claim 18 including:

latching the subclocks according to a line synchronization signal;

generating a shift value according to which subclocks were latched by the line synchronization signal; and shifting the multiple subpixels into alignment with the line synchronization signal according to the shift value.

22. A clock skew synchronizer for aligning subpixels in a print engine with a line synchronization signal comprising:

a digital delay circuit outputting multiple subclocks according to a native pixel clock signal, the multiple subclocks each skewed at multiple different percentages of the native pixel clock period;

multiple registers each having a data input coupled to a different one of the subclocks for shifting subpixel values to multiple different subpixel percentages within the same native pixel clock period;

an edge detector coupled to data outputs of the multiple registers, the edge detector generating a shift value according to which of the multiple registers first detect actuation of the line synchronization signal; and a shift register shifting the subpixels into alignment with the line synchronization signal according to the shift value.

23. A clock skew synchronizer according to claim 22 including a remainder circuit outputting the subpixels not shifted out of the shift register during a next clock period of the native pixel clock.

24. A clock skew synchronizer according to claim 22 including a skew pulse generator receiving the multiple subclocks from the digital delay circuit and the shifted subpixels from the shift register and outputting the shifted subpixels according to the multiple subclocks.

* * * * *

UNITED STATES PATENT AND TRADEMARK OFFICE
CERTIFICATE OF CORRECTION

PATENT NO.          : 6,882,443 B1                                      Page 1 of 1
APPLICATION NO. : 10/001458
DATED                  : April 19, 2005
INVENTOR(S)         : McDonald It is certified that error appears in the above-identified patent and that said Letters Patent is hereby corrected as shown below:

Column 1, line 12, please replace "an electromechanical device" with --an electro-mechanical device--

Column 2, line 57, please replace "register generates' addresses" with --register generates addresses--

Column 4, line 49, please replace "registers 22A and 221" with --registers 22A and 22B--

Column 5, line 41, please replace "for PALM 26" with --for PAM 26--

Column 6, line 47, please replace "4800 DPI etc." with --4800 DPE, etc.--

Column 7, line 48, please replace "000...00...0" with --00011...00...0--

Column 8, line 51, please replace "in tun becomes" with --in turn becomes--

Column 9, line 2, please replace "outputs," with --outputs;--

Column 9, line 28, please replace "together, and" with --together; and--

Column 9, line 38, please replace "together, and" with --together; and--

Signed and Sealed this

Nineteenth Day of December, 2006

JON W. DUDAS
*Director of the United States Patent and Trademark Office*